(12) United States Patent
Peach et al.

(10) Patent No.: US 11,584,288 B2
(45) Date of Patent: Feb. 21, 2023

(54) VEHICLE WHEEL CHOCK HANGER

(71) Applicant: Transportation IP Holdings, LLC, Norwalk, CT (US)

(72) Inventors: Walter J. Peach, Montgomery, IL (US); John D. Anderson, Oswego, IL (US)

(73) Assignee: Transportation IP Holdings, LLC, Norwalk, CT (US)

( * ) Notice: Subject to any disclaimer, the term of this patent is extended or adjusted under 35 U.S.C. 154(b) by 416 days.

(21) Appl. No.: 16/673,353

(22) Filed: Nov. 4, 2019

(65) Prior Publication Data

US 2020/0189440 A1 Jun. 18, 2020

Related U.S. Application Data

(60) Provisional application No. 62/780,620, filed on Dec. 17, 2018.

(51) Int. Cl.
*B60P 3/00* (2006.01)
*B60P 3/077* (2006.01)
*B61D 45/00* (2006.01)
*B61D 3/18* (2006.01)
*B60P 3/079* (2006.01)

(52) U.S. Cl.
CPC .............. *B60P 3/077* (2013.01); *B60P 3/079* (2013.01); *B61D 3/187* (2013.01); *B61D 45/001* (2013.01)

(58) Field of Classification Search
CPC .......... B60P 3/077; B60P 3/079; B60P 3/073; B60P 7/08; B60P 7/0807; B60P 7/0815; B60P 7/0892; B60T 3/00

USPC .................... 410/7, 8, 30, 49, 156
See application file for complete search history.

(56) References Cited

U.S. PATENT DOCUMENTS

| | | | | |
|---|---|---|---|---|
| 4,060,036 A * | 11/1977 | Palms | ..................... | B60P 3/075 410/21 |
| 6,503,037 B2 * | 1/2003 | Thomson | ................ | B60P 3/077 410/117 |
| 7,513,725 B1 * | 4/2009 | Bullock | .................. | B60P 3/077 410/10 |
| 7,824,138 B2 | 11/2010 | Bullock | | |
| 8,047,751 B2 * | 11/2011 | Powers | .................... | B60T 3/00 410/7 |
| 8,870,000 B2 | 10/2014 | Peach et al. | | |
| 8,961,084 B1 | 2/2015 | Anderson et al. | | |
| 9,375,814 B2 | 6/2016 | Vande Sande et al. | | |
| 9,457,705 B2 | 10/2016 | Morin | | |
| 9,469,235 B2 | 10/2016 | Anderson et al. | | |
| 9,604,656 B2 * | 3/2017 | Johnsen | .................. | B60P 3/077 |
| 2009/0003956 A1 | 1/2009 | Tatina | | |

(Continued)

OTHER PUBLICATIONS

Ukrainian Intellectual Property Institute, Office action Issued in Application No. 201606627, dated Oct. 6, 2020, 11 pages.

(Continued)

*Primary Examiner* — Stephen T Gordon
(74) *Attorney, Agent, or Firm* — McCoy Russell LLP

(57) ABSTRACT

Various embodiments provide a vehicle wheel chock hanger for holding different vehicle wheel chocks of different vehicle restraint systems. Various embodiments provide a vehicle wheel chock hanger for vehicle restraint systems for a vehicle such as an auto-rack railroad car that is configured to hold various different chocks that are configured to secure vehicles in that vehicle.

18 Claims, 18 Drawing Sheets

(56) References Cited

U.S. PATENT DOCUMENTS

2011/0038681 A1    2/2011  Cencer
2015/0360701 A1  12/2015  Johnsen
2021/0366323 A1* 11/2021  Buell .................... G09F 21/049

OTHER PUBLICATIONS

"Pictures of Tri-Level Chock Hanger", Available Prior to Dec. 17, 2018 (3 pages).
"Trinity Low Profile Vehicle Restraint System Through Track Mandel (TTM)", Trinity Parts & Components, LLC, Revision 7 (46 pages), May 19, 2016.

* cited by examiner

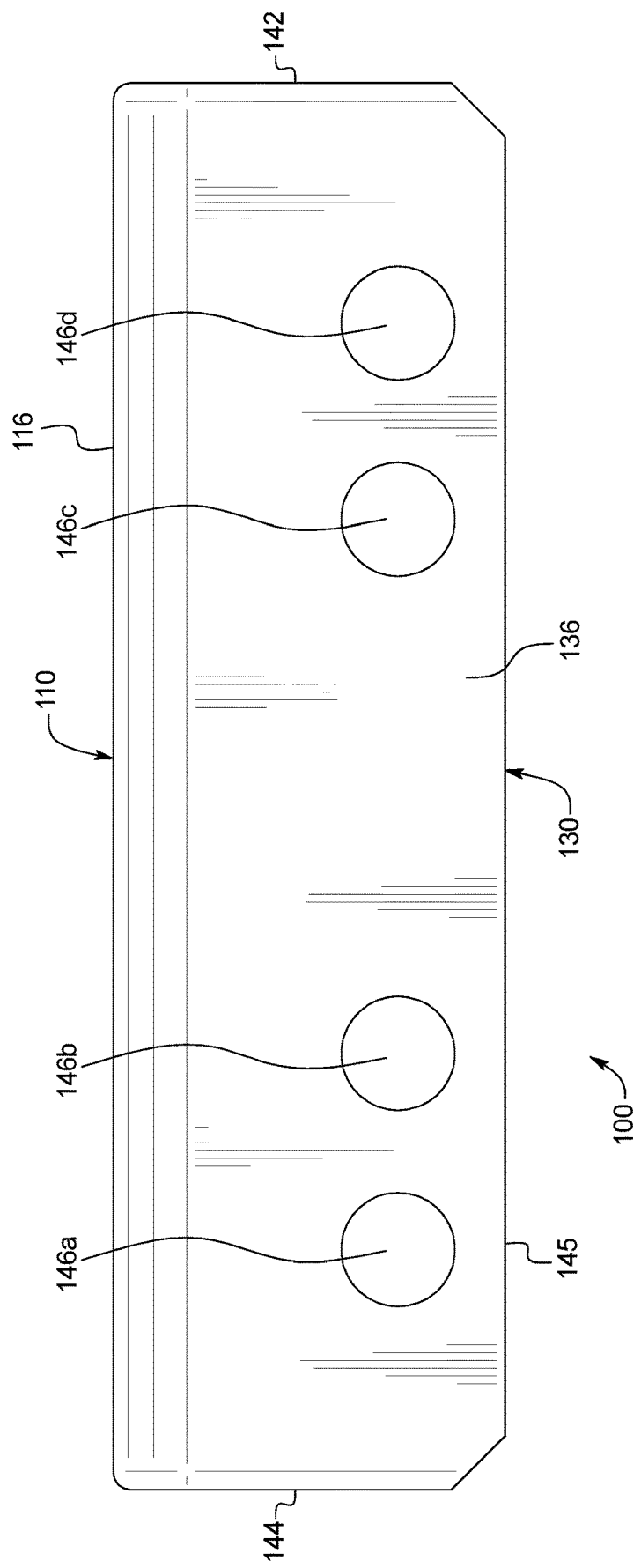

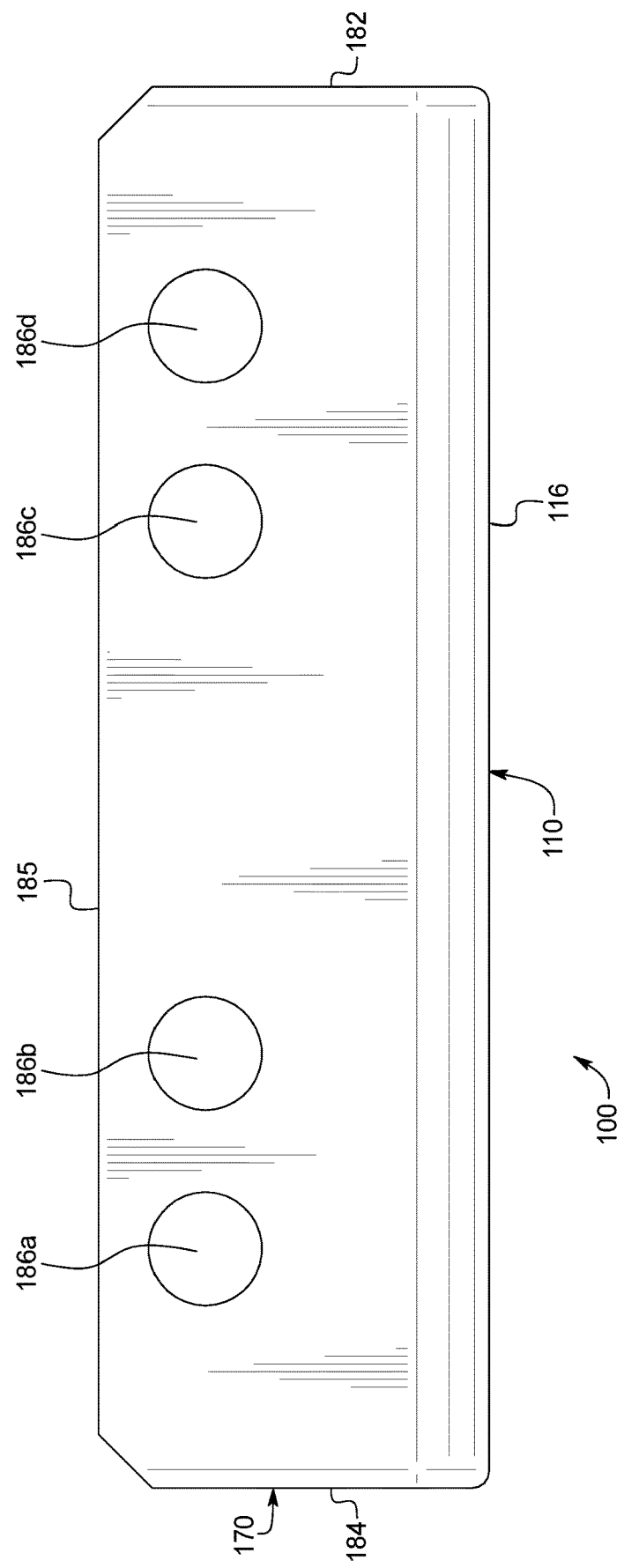

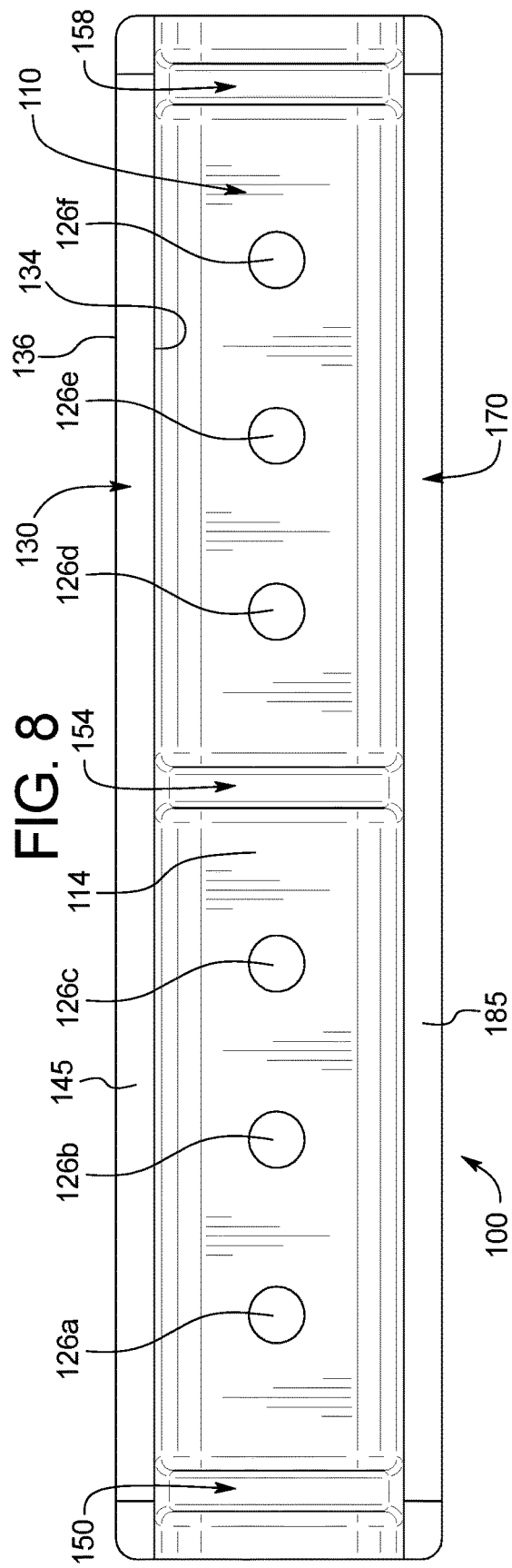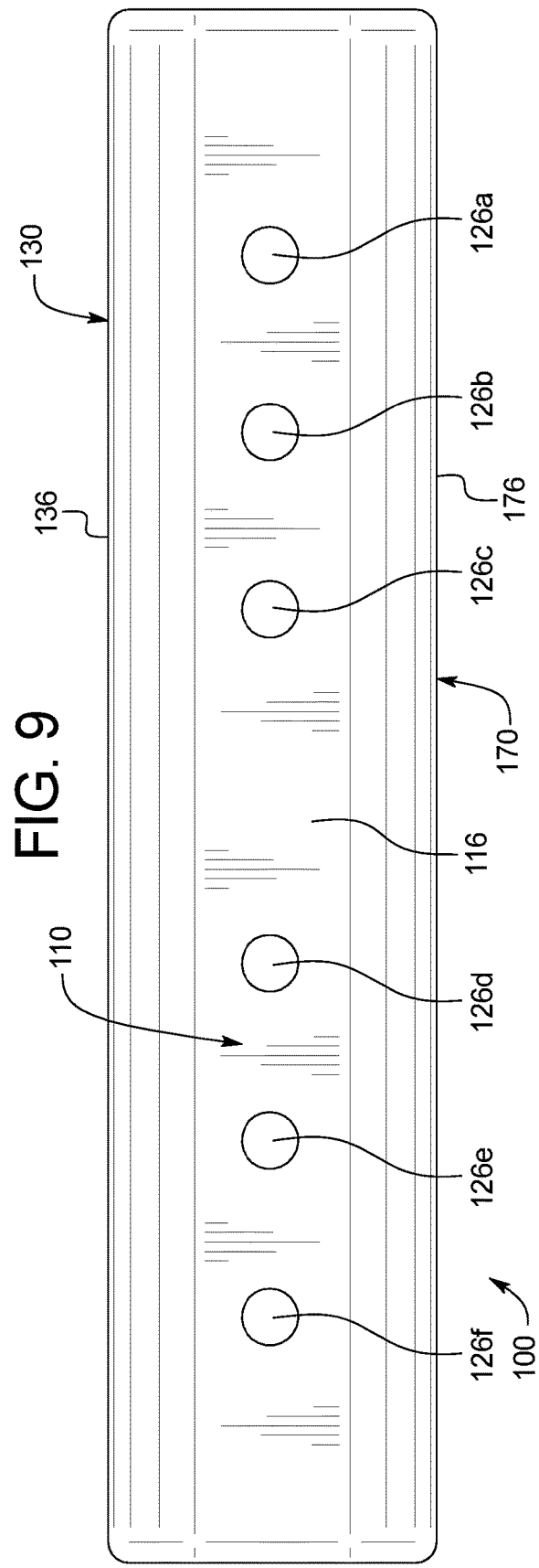

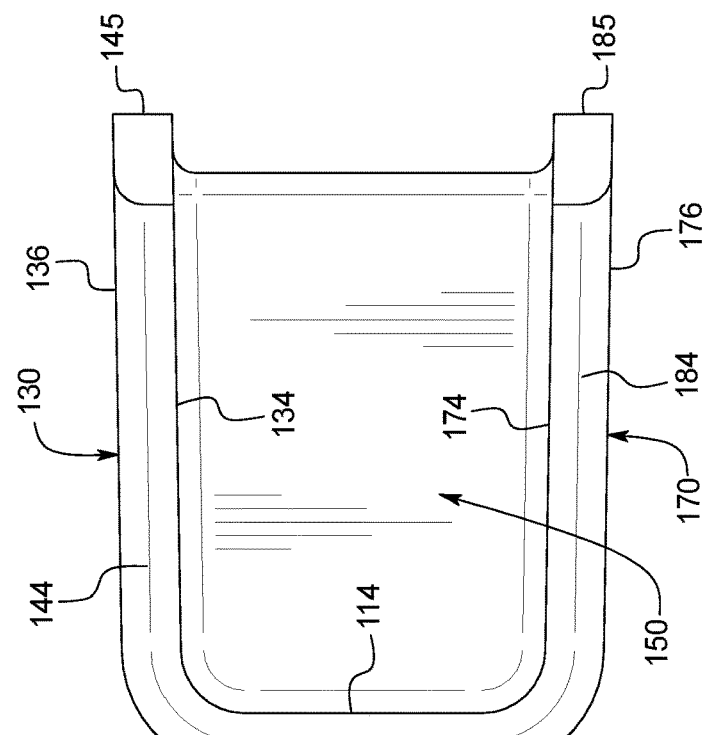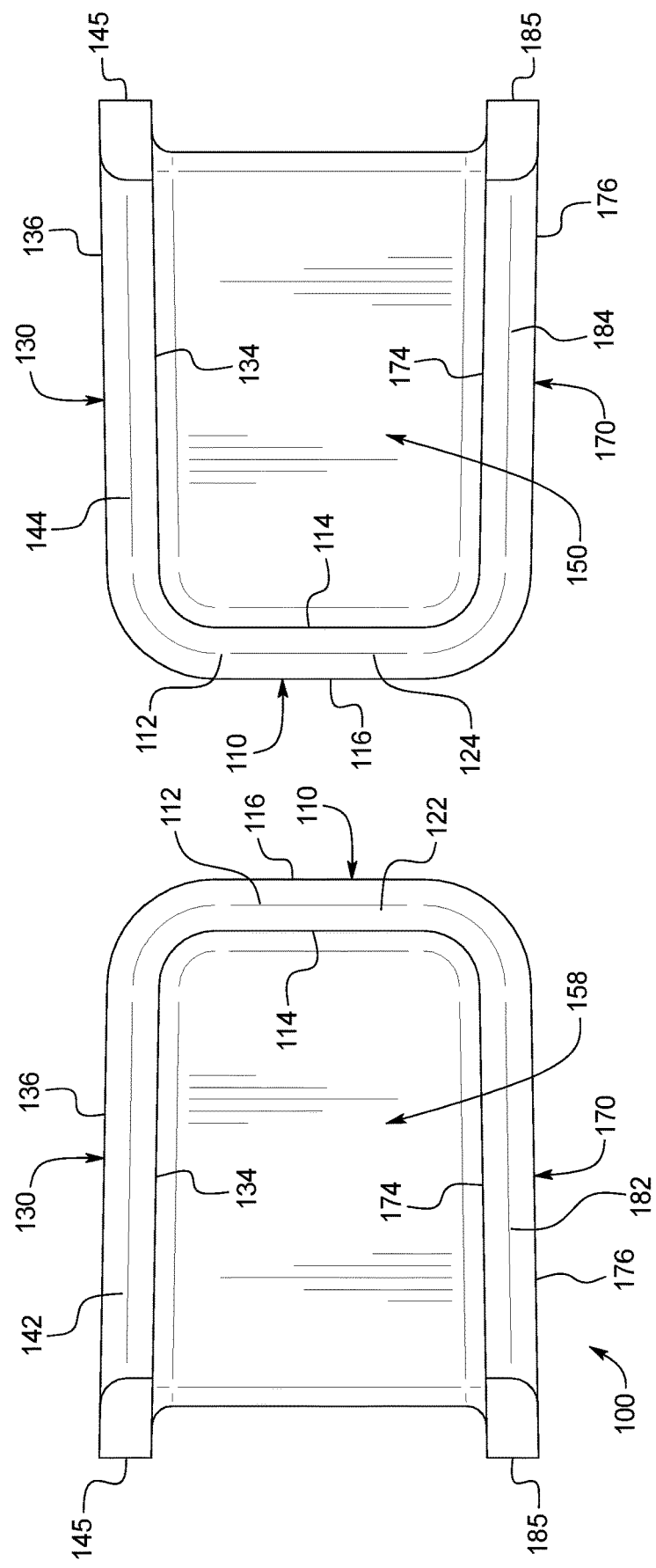

VEHICLE WHEEL CHOCK HANGER

PRIORITY

This application claims priority to and the benefit of U.S. Provisional Patent Application No. 62/780,620, filed Dec. 17, 2018, the entire contents of which is incorporated herein by reference.

BACKGROUND

The railroad industry employs a variety of vehicles such as auto-rack railroad cars for transporting newly-manufactured vehicles (such as automobiles, vans, and trucks). Auto-rack railroad cars, known in the railroad industry as auto-rack cars, often travel thousands of miles through varying terrain. Various types of auto-rack cars are compartmented, having two or three decks, two side walls, a pair of doors at each end, and a roof. Newly manufactured vehicles are loaded into (and unloaded from) an auto-rack car for transport by people (sometimes called "loaders") who drive the vehicles into (or out) of the auto-rack car.

One problem with auto-rack cars is the potential for damage to newly manufactured vehicles. This damage can occur to vehicles being transported in the auto-rack car due to the unwanted movement of one or more of the transported vehicles not adequately secured in the auto-rack car. Various different vehicle restraint systems have been developed and commercialized for securing the vehicles transported in auto-rack cars to prevent movement or shifting of those vehicles in the auto-rack cars during transportation.

One commercialized vehicle restraint system for restraining vehicles transported in tri-level auto-rack cars is disclosed in U.S. Pat. Nos. 8,961,084 and 9,469,235.

Another commercialized vehicle restraint system for restraining vehicles transported in tri-level auto-rack cars is disclosed in U.S. Pat. No. 7,824,138.

Another commercialized vehicle restraint system for restraining vehicles transported in tri-level auto-rack cars is disclosed in U.S. Pat. No. 9,375,814.

Another commercialized vehicle restraint system for restraining vehicles transported in tri-level auto-rack cars is disclosed in U.S. Pat. No. 9,457,705.

Each of these different vehicle restraint systems includes one or more chocks that are each detachably securable to a rail on and securely attached to a floor of a deck of a tri-level auto-rack car. After driving the vehicle into the tri-level auto-rack car on one of the decks, the loader positions two of the chocks adjacent to each of two (or more) of the wheels of the vehicle. The loader also attaches each such chock (that is positioned adjacent to one of the wheels) to the rail on the deck adjacent to that wheel. The loader employs an attachment mechanism of each chock to attach that chock to the rail. Prior to unloading the transported vehicles at their destination, a different loader detaches the chocks from the respective rails and removes these chocks from the positions adjacent to the wheels. If the chocks are left on the decks of the auto-rack car when the vehicles are being unloaded (or when other vehicles are subsequently loaded into the auto-rack car), the vehicles can run over these chocks and cause damage to the vehicles as well as to these chocks. It is therefore important that the chocks are moved out of the way of the vehicles when the chocks are not in use (i.e., not attached to a rail and not restraining a vehicle) to prevent this damage to the vehicles (moving into or out of the auto-rack car) as well as to prevent damage to these chocks. It is also important that the chocks are securely held in their respective stored positions when not in use. For example, during switching and coupling in a railroad yard (where the auto-rack cars are coupled and decoupled with other railroad cars in different freight trains), the auto-rack cars can be subjected to relatively severe jolts during coupling. If the chocks are not secured properly, they can be dislodged and wind up in undesired positions.

In certain known auto-rack cars, when not in use, the chocks are placed in storage boxes that are secured to the deck or one of the side walls of the auto-rack car. One problem with the commercially implemented storage boxes is that they take up space on the decks of the tri-level auto-rack cars. Certain auto-rack car manufacturers and/or users do not want to employ such storage boxes for these chocks.

In certain known auto-rack cars, specifically configured single-chock type brackets have been employed to hold specific chocks. Such specific brackets do not support the various other types of chocks that are employed in tri-level auto-rack cars. Since there are often multiple different types of chocks employed in an auto-rack car, multiple different types of such dedicated known brackets would need to be employed for the multiple different chocks in the same auto-rack car. This is not practical or cost effective.

Accordingly, there is a need for a device configured to enable the storage of multiple different types of chocks in a tri-level auto-rack car when the chocks in the auto-rack car are not in use.

SUMMARY

Various embodiments of the present disclosure solves the above problems by providing a universal vehicle wheel chock hanger for vehicles such as auto-rack cars (and particularly tri-level auto-rack cars) that is configured to hold multiple different types of vehicle wheel chocks. More specifically, in various embodiments, the universal vehicle wheel chock hanger of the present disclosure is configured to be attached to the inner surface of a side wall panel of a vehicle such as an auto-rack car and is configured to securely (but removably) hold any one of a plurality of different types of tri-level type vehicle wheel chocks. In various embodiments, the universal vehicle wheel chock hanger is thus configured to securely (but removably) hold multiple different chocks (at different times). In various embodiments, the universal vehicle wheel chock hanger is also configured to simultaneously securely (but removably) hold multiple chocks (of the same or different type).

In various embodiments of the present disclosure, the universal vehicle wheel chock hanger includes: (1) a mounting base configured to be attached to the side wall panel of an auto-rack car (by fasteners); (2) a first locking pin receiver connected to and extending transversely from the mounting base; and (3) a second locking pin receiver connected to and extending transversely from the mounting base and spaced apart from the first locking pin receiver. In various embodiments of the present disclosure, the universal vehicle wheel chock hanger further includes one or more stabilizers connected to and extending between the first locking pin receiver and the second locking pin receiver. The mounting base defines a plurality of fastener receiving openings that facilitate attachment of the mounting base to one of the side wall panels. The first locking pin receiver defines at least one or a plurality of first locking pin receipt openings that are each configured to receive a locking pin (or other attachment member) of a chock. The second locking pin receiver defines at least one or a plurality of locking pin receipt openings that are each configured to receive a locking pin (or other attachment member) of a chock. The locking pin receipt openings defined in the first locking pin receiver and the second locking pin receiver are aligned in one or more sets such that a locking pin (or other attachment member) of a chock can extend through any opening of any such set of aligned locking pin receipt openings in the first locking pin receiver and the second locking pin receiver to securely hold the chock to the universal vehicle wheel chock hanger. Any of the different types of chocks used in tri-level auto-rack cars can be easily attached to the universal vehicle wheel chock hanger by positioning the chock adjacent to the hanger and using the locking pin (or other attachment member) of the chock (that is used to attach the chock to the rail on the deck) to removably attach the chock to the hanger for storage.

Other objects, features, and advantages of the present disclosure will be apparent from the following detailed disclosure, taken in conjunction with the accompanying sheets of drawings, wherein like reference numerals refer to like parts.

BRIEF DESCRIPTION OF THE FIGURES

FIG. 7A is a top view of the universal vehicle wheel chock hanger of FIG. 2.

FIG. 7B is a bottom view of the universal vehicle wheel chock hanger of FIG. 2.

FIG. 8 is a front view of the universal vehicle wheel chock hanger of FIG. 2.

FIG. 9 is a rear view of the universal vehicle wheel chock hanger of FIG. 2.

FIG. 10A is a right side view of the universal vehicle wheel chock hanger of FIG. 2.

FIG. 10B is a left side view of the universal vehicle wheel chock hanger of FIG. 2.

DETAILED DESCRIPTION

Figure 1:
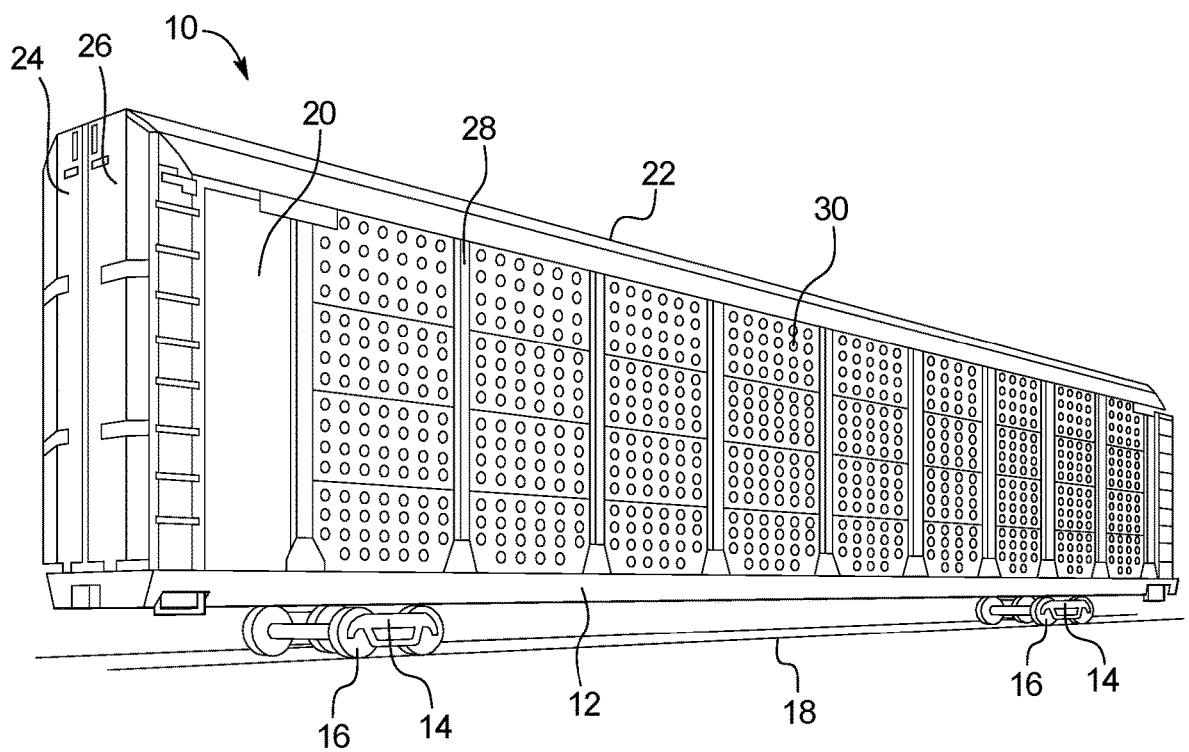
FIG. 1 is a perspective view of an auto-rack railroad car configured to transport a plurality of vehicles.

Referring now to the drawings and particularly to FIG. 1, an example vehicle in the form of an auto-rack car 10 includes a frame 12 supported by trucks 14, each of which have several wheels 16 configured to roll along railroad tracks 18. The frame 12 supports two spaced-apart side walls 20 and a roof 22. The auto-rack car 10 includes a pair of co-acting clamshell doors 24 and 26 mounted on each end of the auto-rack car 10. Each set of doors 24 and 26 are openable to facilitate the loading and unloading of vehicles into and out of the auto-rack car 10 (and are configured to be closed during transport and storage of the vehicles).

Figure 2:
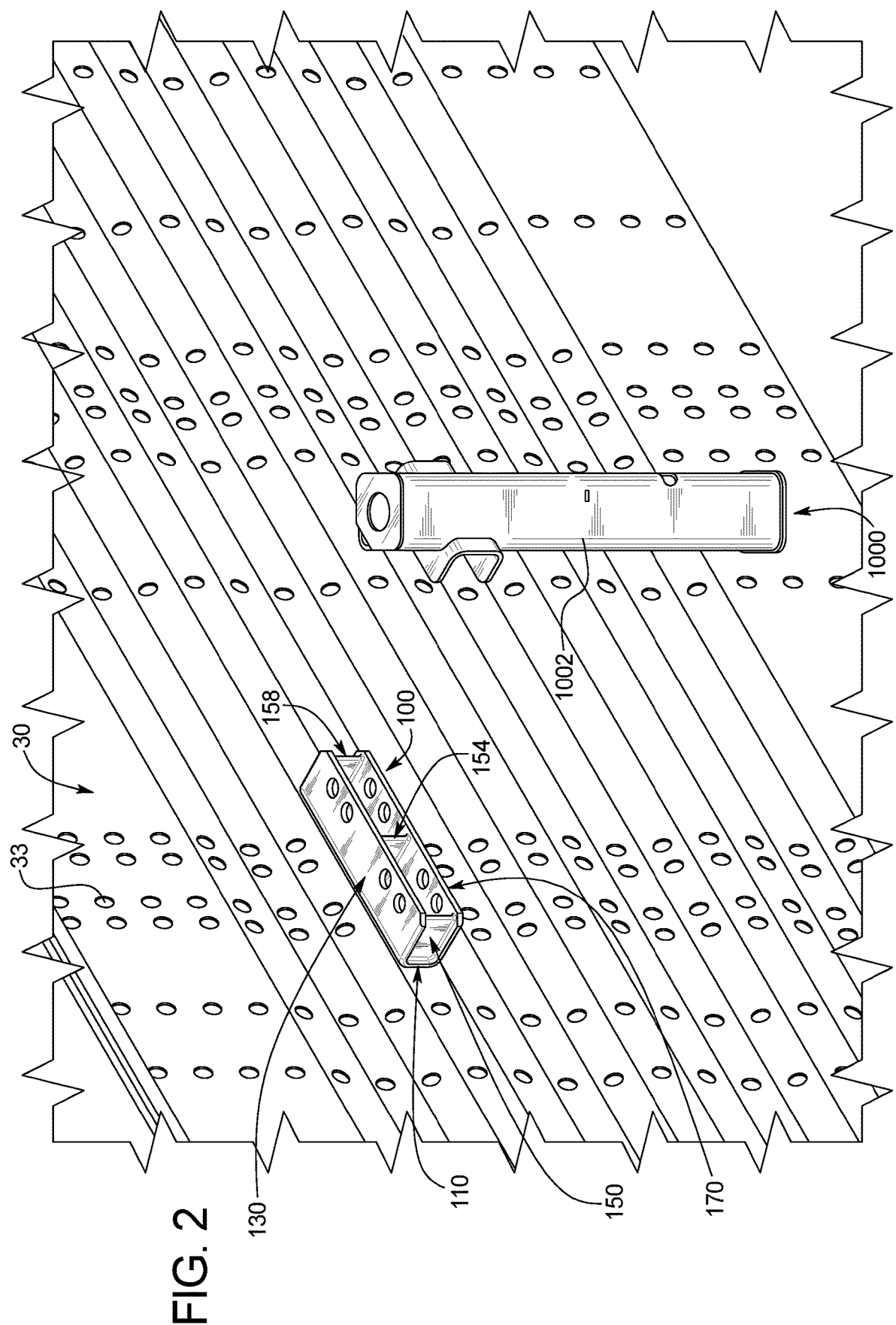
FIG. 2 is a perspective view of one embodiment of the universal vehicle wheel chock hanger of the present disclosure mounted on a side wall panel of an auto-rack railroad car (shown in fragmentary), and which illustrates a first type of vehicle wheel chock prior to attachment to the vehicle wheel chock hanger.
Figure 4:
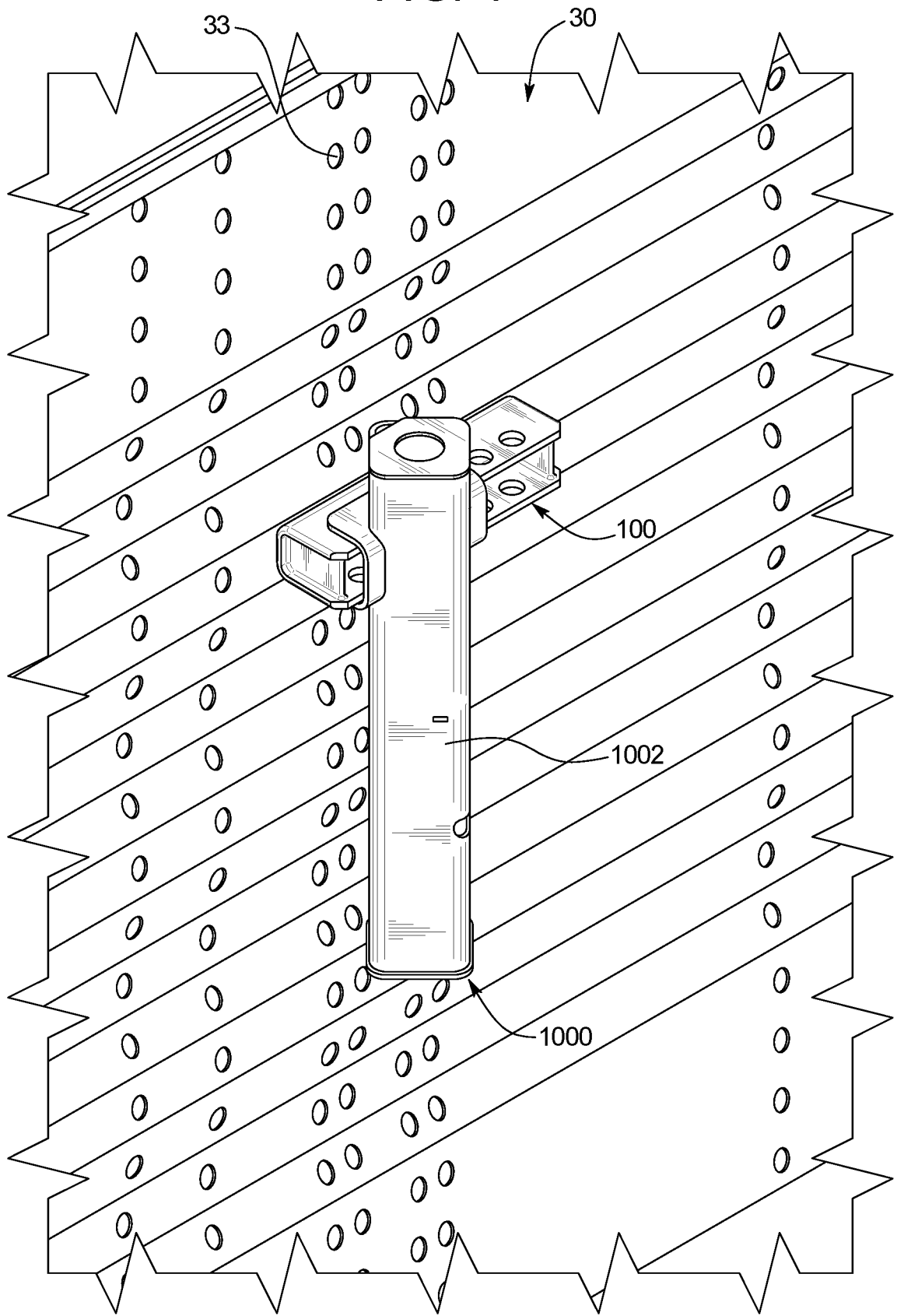
FIG. 4 is a perspective view of the universal vehicle wheel chock hanger of FIG. 2, the vehicle wheel chock of FIG. 2, and the side wall panel of FIG. 2, and which illustrates the universal vehicle wheel chock hanger mounted to the side wall panel, and which illustrates the vehicle wheel chock removably attached to the universal vehicle wheel chock hanger.

The side walls 20 each include a series of steel vertical posts 28 which are mounted on, and extend upwardly from, the frame 12. The roof 22 is mounted on and supported by these vertical posts 28. The vertical posts 28 are spaced along the entire length of both side walls 20 of the auto-rack car 10. A plurality of rectangular galvanized steel side wall panels 30 that extend horizontally and are vertically spaced apart are mounted between various pairs of vertical posts 28. These side wall panels 30 are supported at their corners by brackets (not shown) that are suitably secured to the respective vertical posts 28. More specifically, as shown in FIGS. 2 and 4, each side wall panel 30 has a multiplicity of round side wall panel holes 33. These side wall panel holes 33 provide the auto-rack car 10 with natural light as well as proper ventilation. Proper ventilation prevents harm from the toxic vehicle fumes to the loaders loading or unloading the vehicles into or out of the auto-rack car 10. These side wall panels 30 are generally corrugated to add strength, and include spaced apart flat or vertically extending surfaces and spaced apart angled extending surfaces. The auto-rack car 10 in this example embodiment is a tri-level auto-rack car having first, second, and third levels. Normally, fifteen to eighteen passenger vehicles (i.e., such as five to six on each level) can be transported in a tri-level auto-rack car.

Referring now to FIGS. 2, 3, 4, 5, 6, 7A, 7B, 8, 9, 10A, and 10B, one example embodiment of the universal vehicle wheel chock hanger, generally indicated by numeral 100, is configured to securely (but removably) hold one or more chocks such as chock 1000 when the chock 1000 is not in use. It should be appreciated that for purposes of this disclosure, the illustrated chock 1000 is one of the embodiments of the chocks described in U.S. Pat. No. 8,961,084; however, the universal vehicle wheel chock hanger of the present disclosure is configured to securely hold multiple different chocks (at different points in time) such as but not limited to any of the chocks described in U.S. Pat. Nos. 7,824,138, 9,375,814, or 9,457,705 referenced above. Certain such examples are further discussed below with respect to FIGS. 11A, 11B, and 12.

The illustrated example vehicle wheel chock hanger 100, which is sometimes referred to herein as the hanger 100 for brevity, generally includes: (1) a mounting base 110 configured to be attached to an inner surface of a side wall panel (such as side wall panel 30) of an auto-rack car (such as auto-rack car 10) by suitable fasteners (such as fastener 90); (2) a first pin receiver 130 integrally connected to and transversely extending from the mounting base 110; (3) a second pin receiver 170 integrally connected to and transversely extending from the mounting base 110 and spaced apart from the first pin receiver 130; (4) a plurality of spaced-apart stabilizers 150, 154, and 158 extending between, connected to, and connecting the spaced-apart first pin receiver 130 and second pin receiver 170.

More specifically, in this illustrated example embodiment, the mounting base 110 includes an elongated wall 112 having an interior surface 114, an exterior surface 116, a first (right) side edge 122, and a second (left) side edge 124. The wall 112 has a generally flat rectangular portion (not labeled) and curved upper and lower portions (not labeled) that are respectively integrally connected to and formed with the inner portions of the first pin receiver 130 and second pin receiver 170.

The wall 112 defines a plurality of spaced apart attachment holes such as attachment holes 126a, 126b, 126c, 126d, 126e, and 126f. These attachment holes 126a, 126b, 126c, 126d, 126e, and 126f are each sized and configured to receive a suitable fastener, such as fastener 90, for securely attaching the mounting base 110 and the entire universal vehicle wheel chock hanger 100 to an inner surface of a side wall panel 30 of the auto-rack car 10 as generally shown in FIGS. 2, 3, 4, and 5. The attachments holes 126a, 126b, 126c, 126d, 126e, and 126f are suitably spaced apart to be aligned with a plurality of side wall panel holes such as holes 33 in a side wall panel such as side wall panel 30 of an auto-rack car such as auto-rack car 10 to facilitate secure and flush mounting or attachment of the mounting base 110 (and thus the entire universal vehicle wheel chock hanger 100) to the side wall panel 30 (and thus to the respective side wall of the auto-rack car 10). The attachment holes 126a, 126b, 126c, 126d, 126e, and 126f are each round in this illustrated example embodiment. One or more of the attachment holes may be other shapes (such as oval) to facilitate alignment and to account for the variations in the corrugated side wall panels of auto-rack cars. It should also be appreciated that the sizes, positions, and quantity of the attachment holes may vary in accordance with the present disclosure. It should also be appreciated that the fasteners may be any suitable fasteners. It should also be appreciated that the wall 112 can be alternatively formed, sized, shaped, or otherwise configured in accordance with the present disclosure.

Figure 3:
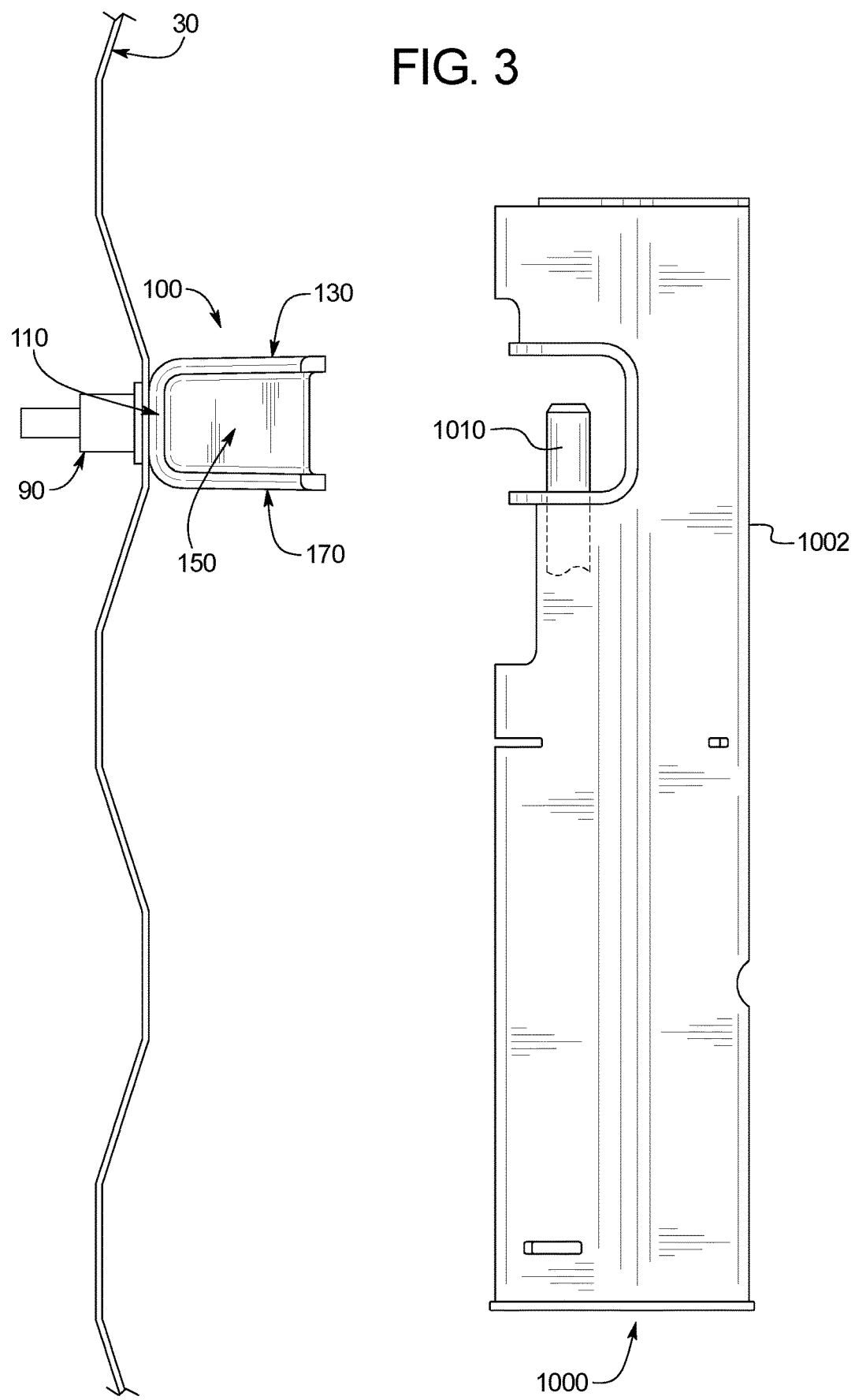
FIG. 3 is a side view of the universal vehicle wheel chock hanger of FIG. 2, the vehicle wheel chock of FIG. 2, and the side wall panel of FIG. 2, and which illustrates the universal vehicle wheel chock hanger mounted on the side wall panel, and which illustrates the vehicle wheel chock prior to attachment to the universal vehicle wheel chock hanger.
Figure 5:
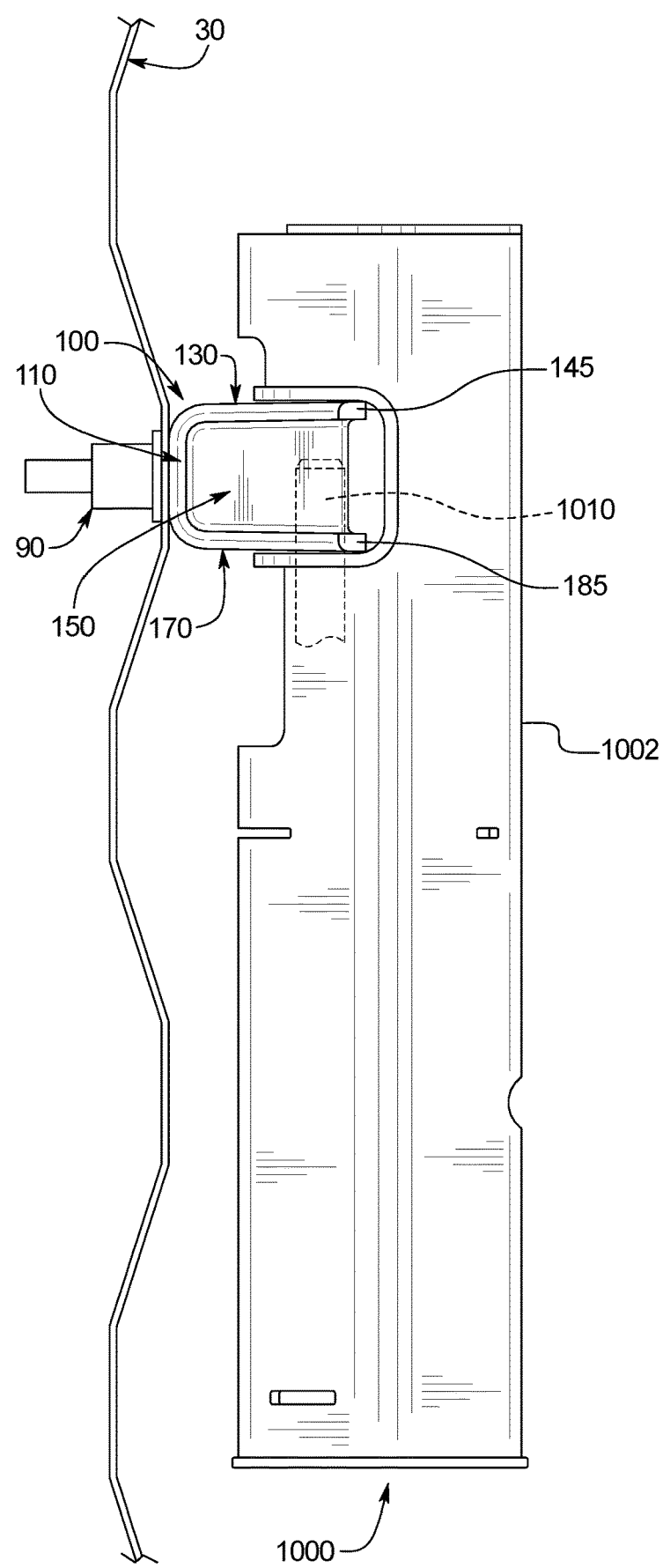
FIG. 5 is a side view of the universal vehicle wheel chock hanger of FIG. 2, the vehicle wheel chock of FIG. 2, and the side wall panel of FIG. 2, and which illustrates the universal vehicle wheel chock hanger mounted to the side wall panel, and which illustrates the vehicle wheel chock removably attached to the universal vehicle wheel chock hanger.
Figure 6:
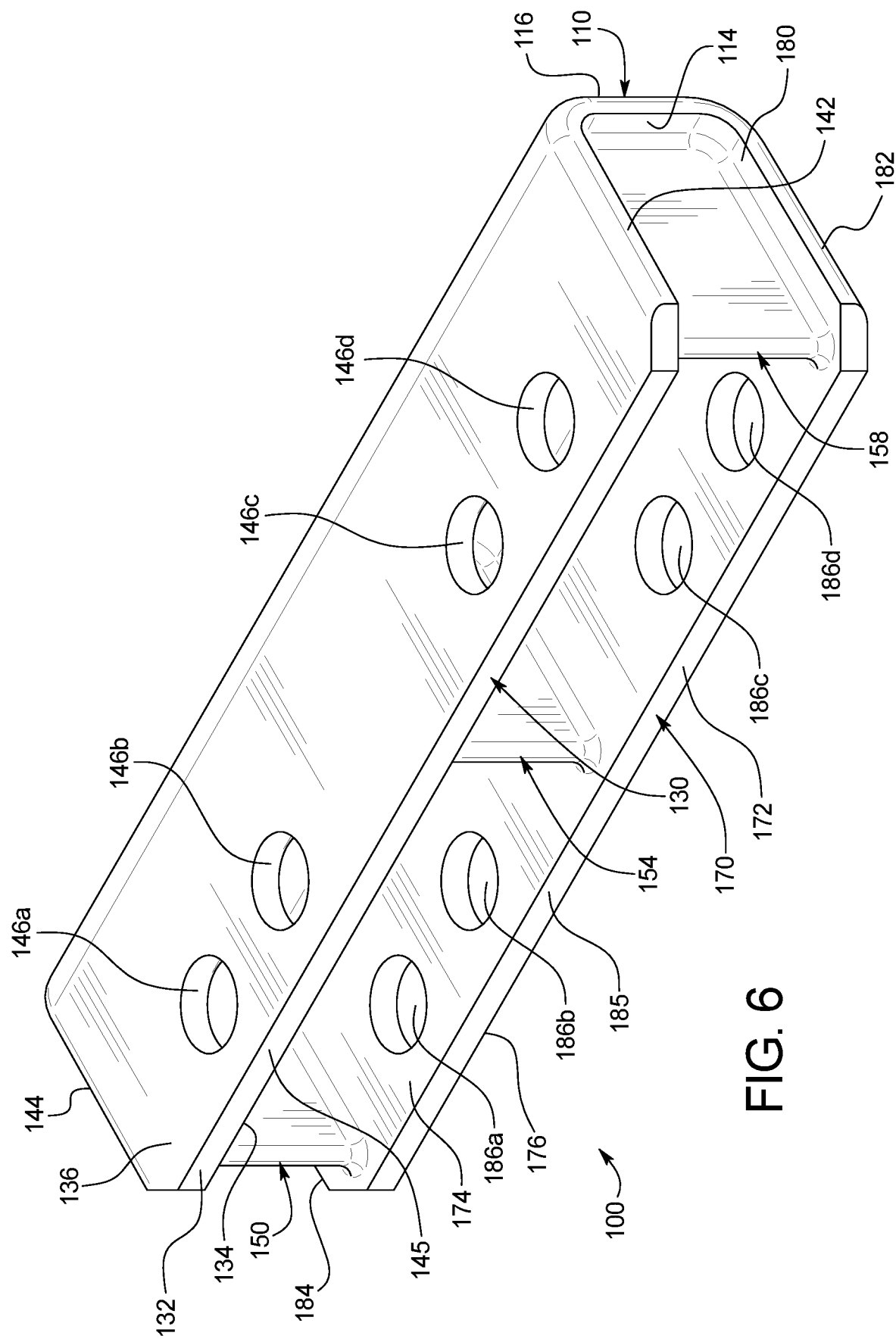
FIG. 6 is a top front perspective view of the universal vehicle wheel chock hanger of FIG. 2.

The first pin receiver 130, in this illustrated example embodiment, includes an elongated substantially flat wall 132 having an interior surface 134, an exterior surface 136, an inner portion (not labeled), an outer portion (not labeled), a first (right) side edge 142, a second (left) side edge 144, and a front edge 145. The wall 132 is generally rectangular and defines a plurality of spaced apart locking pin receipt holes such as locking pin receipt holes 146a, 146b, 146c, and 146d. These locking pin receipt holes 146a, 146b, 146c, and 146d are each sized and configured to receive part of a locking pin (or other attachment member) of a chock such as locking pin 1010 of chock 1000 as shown in FIGS. 3 and 5 to facilitate secure (but removable attachment) of a chock such as chock 1000 to the universal vehicle wheel chock hanger 100 (as shown in FIGS. 4 and 5). In certain embodiments, each pin receipt hole has a suitable diameter for securely receiving an attachment pin. The generally rectangular wall 132 in this illustrated example embodiment includes outer angled corners instead of sharp corners.

Likewise, the second pin receiver 170, in this illustrated example embodiment, includes an elongated substantially flat wall 172 having an interior surface 174, an exterior surface 176, an inner portion (not labeled), an outer portion (not labeled), a first (right) side edge 182, a second (left) side edge 184, and a front edge 185. The wall 172 is generally rectangular and defines a plurality of spaced apart locking pin receipt holes such as locking pin receipt holes 186a, 186b, 186c, and 186d. These locking pin receipt holes 186a, 186b, 186c, and 186d are each sized and configured to receive part of a locking pin (or other attachment member) of a chock such as locking pin 1010 of chock 1000 as shown in FIGS. 3 and 5 to facilitate secure (but removable attachment) of a chock such as chock 1000 to the universal vehicle wheel chock hanger 100 (as shown in FIGS. 4 and 5). In certain embodiments, each pin receipt hole has a suitable diameter for securely receiving an attachment pin. The generally rectangular wall 172 in this illustrated example embodiment includes outer angled corners instead of sharp corners.

In this illustrated example embodiment, the locking pin receipt holes 146a, 146b, 146c, and 146d of the first pin receiver 130 are respectively aligned with the locking pin receipt holes 186a, 186b, 186c, and 186d of the second pin receiver 170. Specifically, (1) locking pin receipt hole 146a is aligned with locking pin receipt hole 186a; (2) locking pin receipt hole 146b is aligned with locking pin receipt hole 186b; (3) locking pin receipt hole 146c is aligned with locking pin receipt hole 186c; and (4) locking pin receipt hole 146d is aligned with locking pin receipt hole 186d.

In this illustrated example embodiment, the first pin receiver 130 and the second pin receiver 170 extend the same distance outwardly from the mounting base 110. As generally shown in FIG. 5, the first pin receiver 130 and the second pin receiver 170 are configured to extend into the generally U-shaped member (or saddle) (not labeled) of the chock 1000 to provide secure engagement with the generally U-shaped member (or saddle). As also generally shown in FIG. 5, the first pin receiver 130 and the second pin receiver 170 are suitably spaced apart to extend between and be engaged by the two opposing walls of the generally U-shaped member (or saddle) of the chock 1000 to provide secure engagement with the generally U-shaped member (or saddle).

In this illustrated example embodiment, each of the plurality of spaced-apart stabilizers 150, 154, and 158 extends between the spaced-apart first pin receiver 130 and second pin receiver 170. More specifically, stabilizer 150 includes an elongated substantially flat wall having an upper portion (not labeled) integrally connected to the wall 132 of the first pin receiver 130, a lower portion (not labeled) integrally connected to the wall 172 of the second pin receiver 170, an inner portion (not labeled) integrally connected to the wall 112 of the mounting base 110, and a front portion (not labeled). Likewise, stabilizer 154 includes an elongated substantially flat wall having an upper portion (not labeled) integrally connected to the wall 132 of the first pin receiver 130, a lower portion (not labeled) integrally connected to the wall 172 of the second pin receiver 170, an inner portion (not labeled) integrally connected to the wall 112 of the mounting base 110, and a front portion (not labeled). Likewise, stabilizer 158 includes an elongated substantially flat wall having an upper portion (not labeled) integrally connected to the wall 132 of the first pin receiver 130, a lower portion (not labeled) integrally connected to the wall 172 of the second pin receiver 170, an inner portion (not labeled) integrally connected to the wall 112 of the mounting base 110, and a front portion (not labeled). These stabilizers 150, 154, and 158 assist in maintaining the first pin receiver 130 and the second pin receiver in parallel or substantially parallel relation or positions (when the weight of the chock(s) rest on such members).

In this illustrated example embodiment, the stabilizers have suitable curvatures and do not have sharp corners.

It should be appreciated that the quantity, positions and configuration of the stabilizers may vary in accordance with the present disclosure. It should be appreciated that in various alternative embodiments, the chock hanger does not include such stabilizers.

It should be appreciated that the universal vehicle wheel chock hanger 100 and specifically the mounting base 110, the first locking pin receiver 130, the second locking pin receiver 170, and the stabilizers 150, 154, and 158 may be made from any suitably strong material (such as a metal). In certain example embodiments, universal vehicle wheel chock hanger 100 including the mounting base 110, the first locking pin receiver 130, the second locking pin receiver 170, and the stabilizers 150, 154, and 158 (if present in the chock hanger) are made from aluminum and monolithically formed. In certain other example embodiments, universal vehicle wheel chock hanger 100 including the mounting base 110, the first locking pin receiver 130, the second locking pin receiver 170, and the stabilizers 150, 154, and 158 are molded or otherwise monolithically formed from a suitable plastic or polymer such as an ultra high molecular weight polyethylene.

It should also be appreciated that the mounting base, the first and second locking pin receivers, and the stabilizers may be alternatively shaped, sized, configured and attached provided that the shape, size, configuration and attachment does not interfere with the attachment of various different chocks.

As best seen in FIGS. 2, 3, 4, and 5, the universal vehicle wheel chock hanger 100 is configured to support example chock 1000. Chock 1000 generally includes a body 1002 that supports a movable locking pin 1010 that is part of a locking assembly configured to securely attach the chock 1000 to a rail as described in detail in U.S. Pat. Nos. 8,961,084 and 9,469,235. The pin 1010 is moveable downwardly against a spring and biased upwardly by the spring (in this shown orientation).

Thus, it should be appreciated that the vehicle wheel chock hanger 100 is configured to be mounted or attached to the inner surface of the side wall panel of an auto-rack car 10 as generally illustrated in FIGS. 2, 3, 4, and 5. These figures show that multiple fasteners can be employed to attach the mounting base 110 of the universal vehicle wheel chock hanger 100 to the side wall panel 30 of the auto-rack car 10. These figures also show that the attachment holes facilitate alignment with the holes in the flat or vertically extending portion(s) of the side wall panel 30.

FIGS. 2 and 3 generally show the alignment and positioning of the example chock 1000 relative to the vehicle wheel chock hanger 100 before the chock 1000 is mounted on or attached to the vehicle wheel chock hanger 100 for storage.

FIGS. 4 and 5 generally show the alignment and positioning of the example chock 1000 relative to the vehicle wheel chock hanger 100 after the chock 1000 is mounted on or attached to the vehicle wheel chock hanger 100 for storage. FIG. 5 also generally shows the movable locking pin 1010 of the example chock 1000 extending through the lower one of two of the aligned locking pin receipt holes of the first pin receiver 130 and the second pin receiver 170 of the vehicle wheel chock hanger 100 after the chock 1000 is mounted on or attached to the vehicle wheel chock hanger 100 for storage.

FIG. 5 further shows that the first pin receiver 130 supports the body 1002 of the chock 1000 and specifically the wall of the saddle (which is the top wall in FIG. 5) after the chock 1000 is mounted on or attached to the vehicle wheel chock hanger 100 for storage. FIG. 5 also shows the relatively tight fit between the saddle of the chock and the chock hanger 100. This configuration prevents the chock 1000 from falling off of the chock hanger 100 without the locking pin 1010 of the chock 1000 being moved downwardly against the force of a spring (not shown) that holds the locking pin 1010 in the position shown in FIG. 5. This configuration also spreads out the weight of the chock and any downward and/or inward forces from the chock 1000 to the chock hanger 100, and thus prevents sagging of the chock 1000.

Figure 11A:
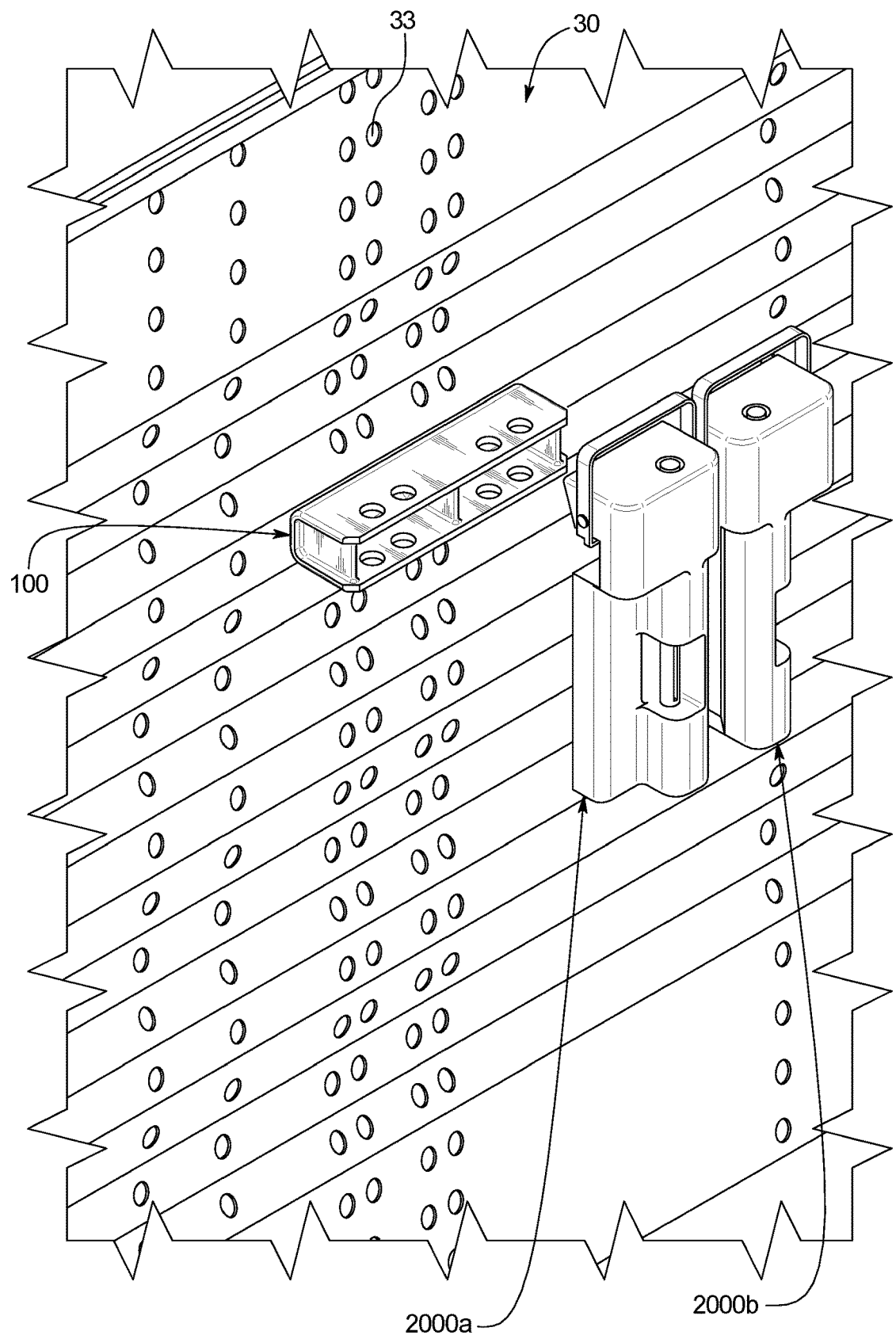
FIG. 11A is a perspective view of the universal vehicle wheel chock hanger of FIG. 2, different vehicle wheel chocks, and the side wall panel of FIG. 2, and which illustrates the universal vehicle wheel chock hanger mounted to the side wall panel, and which illustrates the different vehicle wheel chocks prior to attachment to the universal vehicle wheel chock hanger.
Figure 11B:
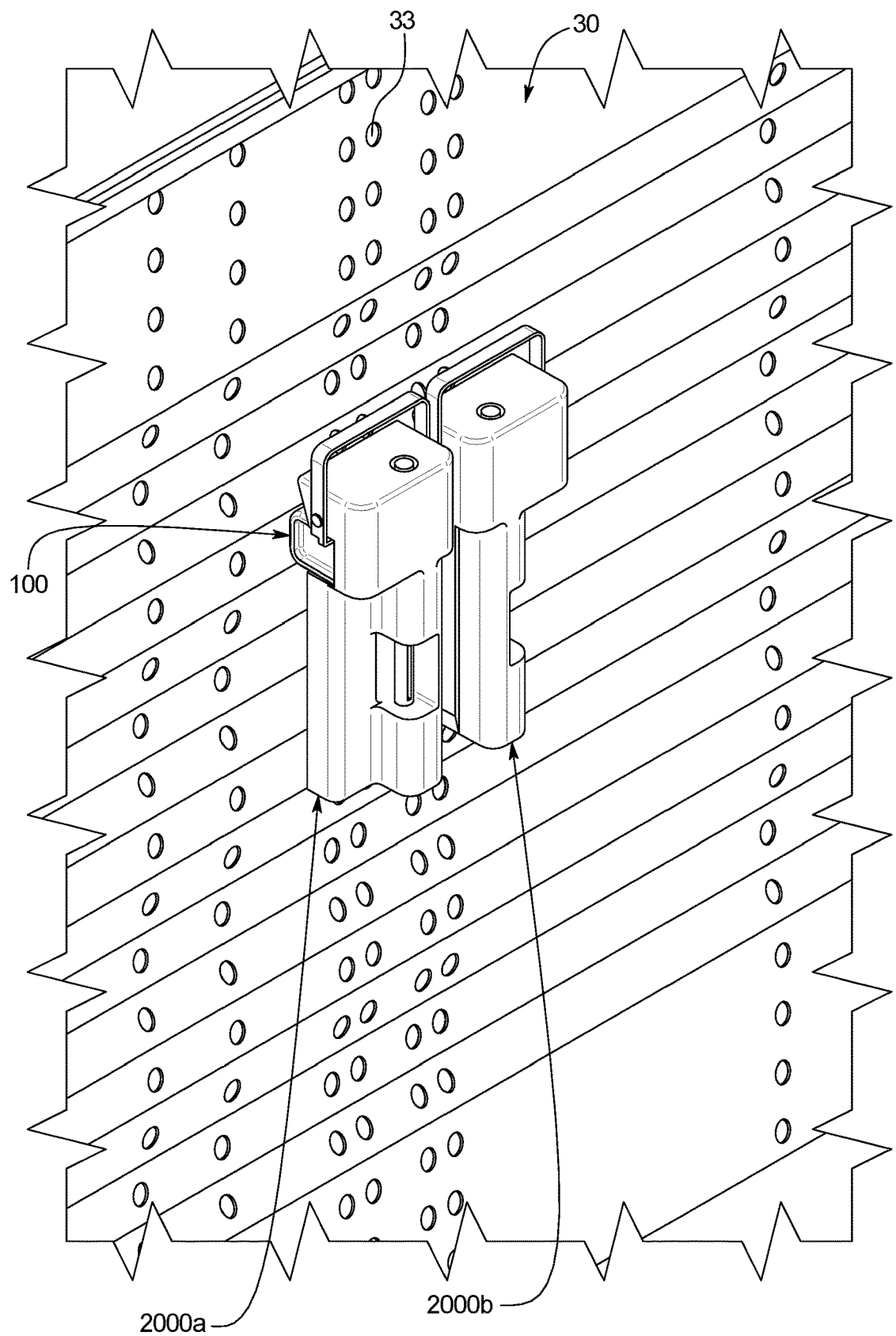
FIG. 11B is a perspective view of the universal vehicle wheel chock hanger of FIG. 2, the vehicle wheel chocks of FIG. 11A, and the side wall panel of FIG. 2, and which illustrates the universal vehicle wheel chock hanger mounted to the side wall panel, and which illustrates the different vehicle wheel chocks attached to the universal vehicle wheel chock hanger.

FIGS. 11A and 11B generally show the alignment and positioning of different example chocks 2000a and 2000b relative to the vehicle wheel chock hanger 100 before and after the chocks 2000a and 2000b are mounted on or attached to the vehicle wheel chock hanger 100 for storage.

Figure 12:
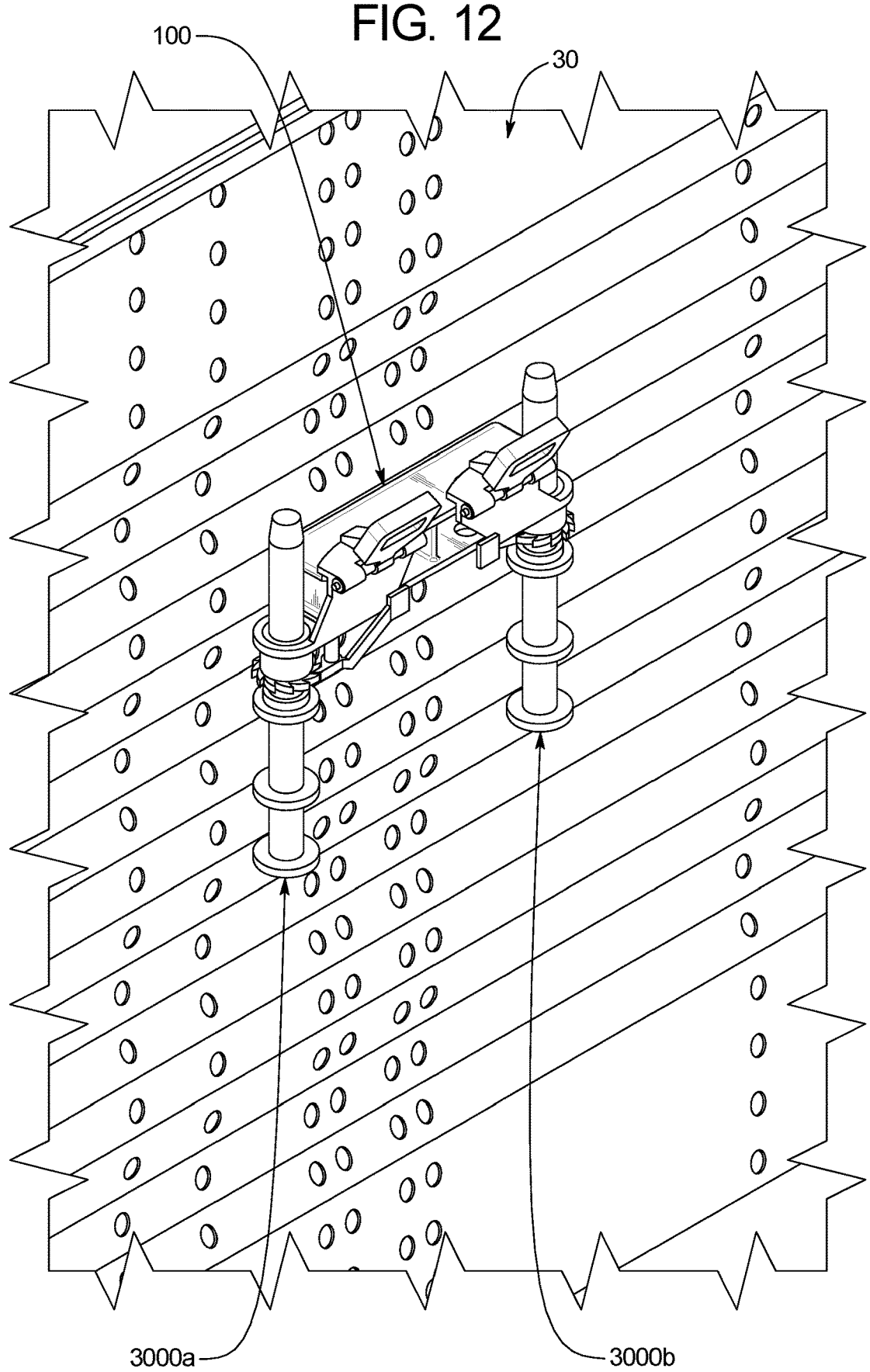
FIG. 12 is a perspective view of the universal vehicle wheel chock hanger of FIG. 2, further different vehicle wheel chocks, and the side wall panel of FIG. 2, and which illustrates the universal vehicle wheel chock hanger mounted to the side wall panel, and which illustrates the further different vehicle wheel chocks attached to the universal vehicle wheel chock hanger.
Figure 13:
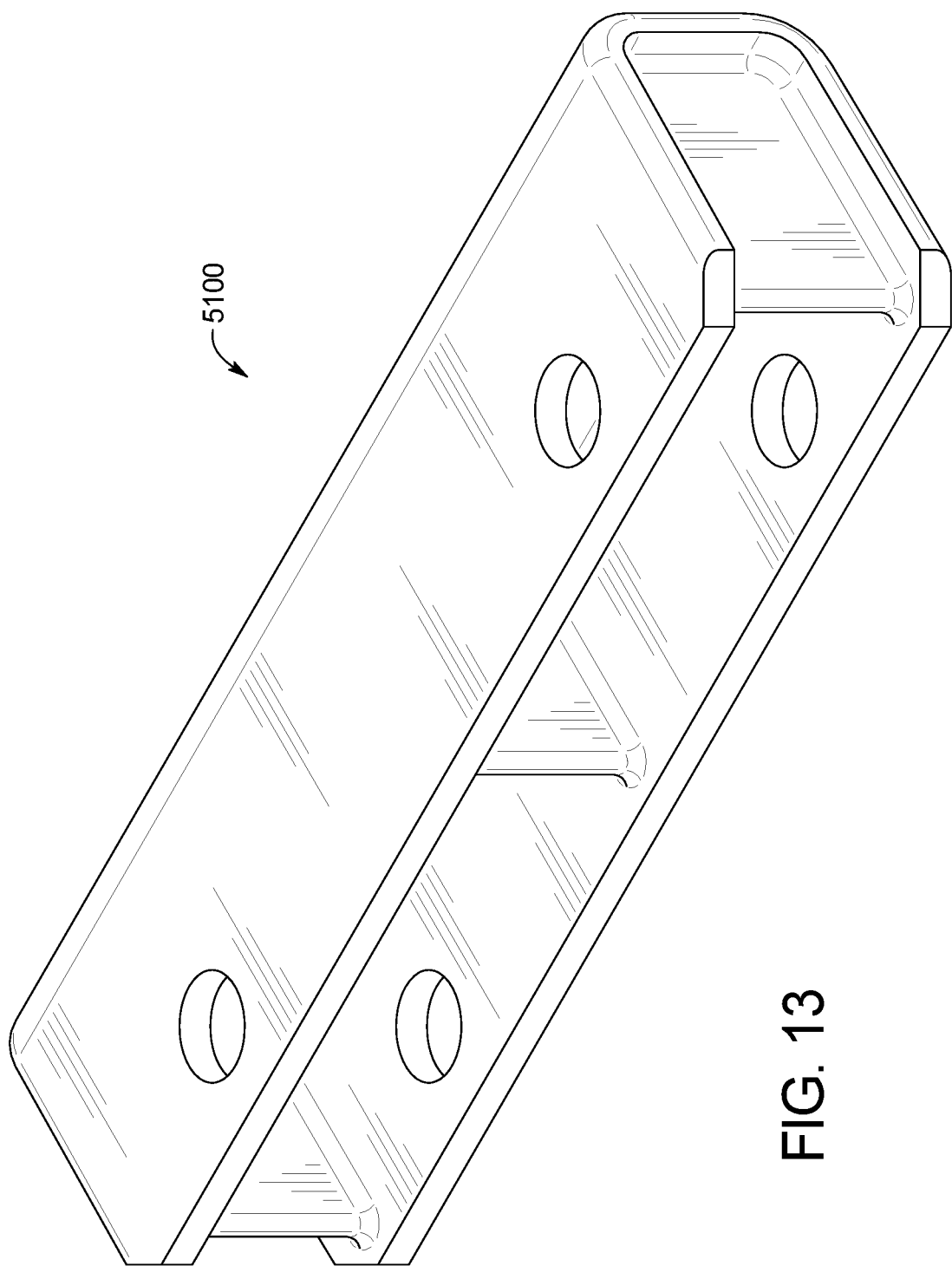
FIG. 13 is a top front perspective view of another example embodiment of the universal vehicle wheel chock hanger of the present disclosure.
Figure 14A:
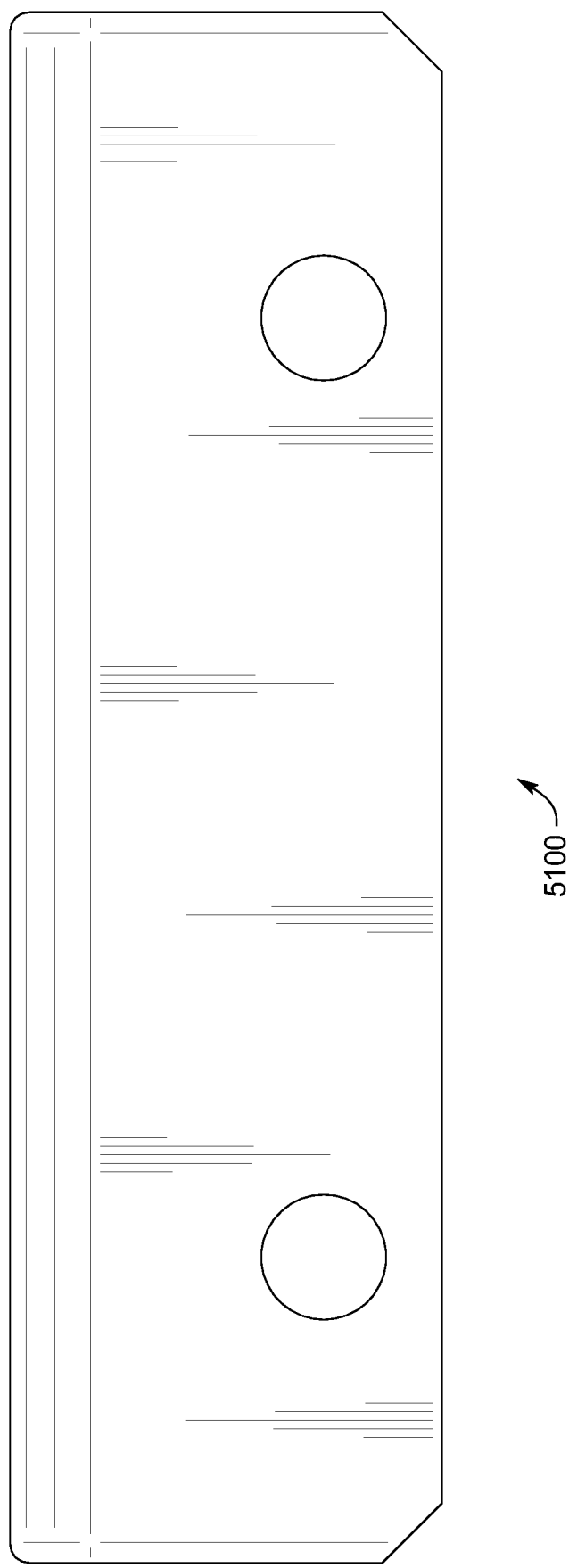
FIG. 14A is a top view of the universal vehicle wheel chock hanger of FIG. 13.
Figure 14B:
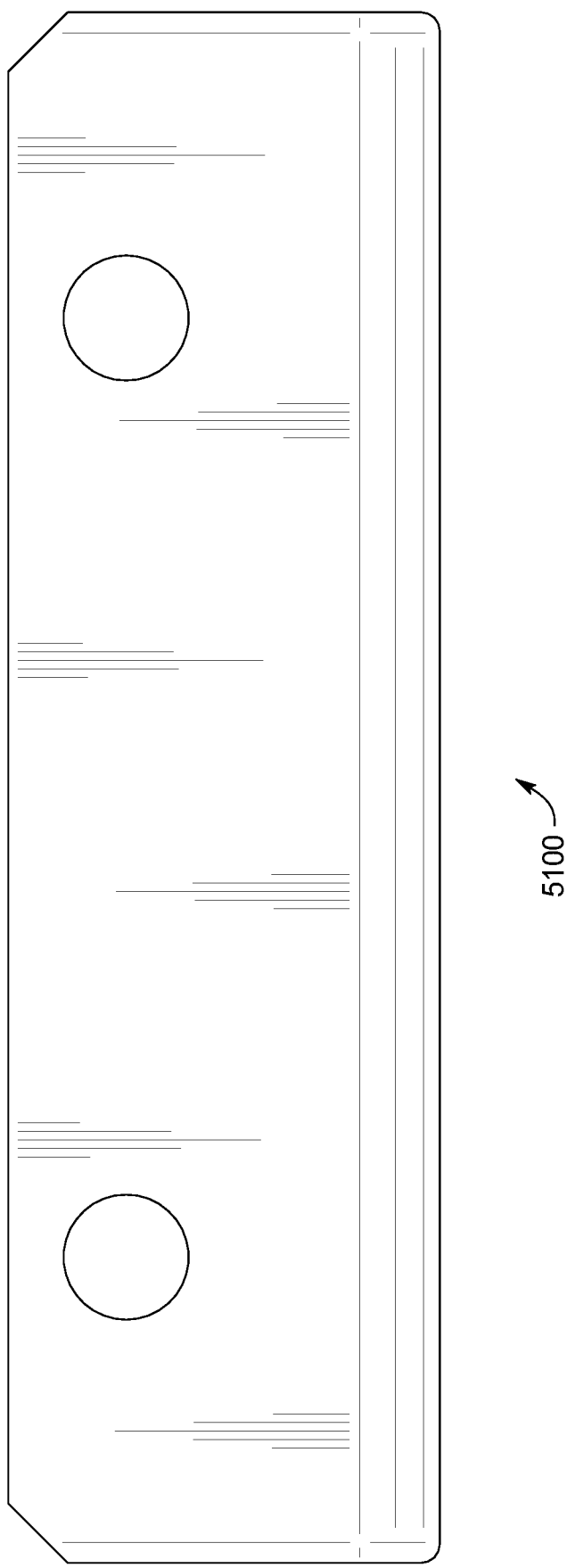
FIG. 14B is a bottom view of the universal vehicle wheel chock hanger of FIG. 13.
Figure 15:
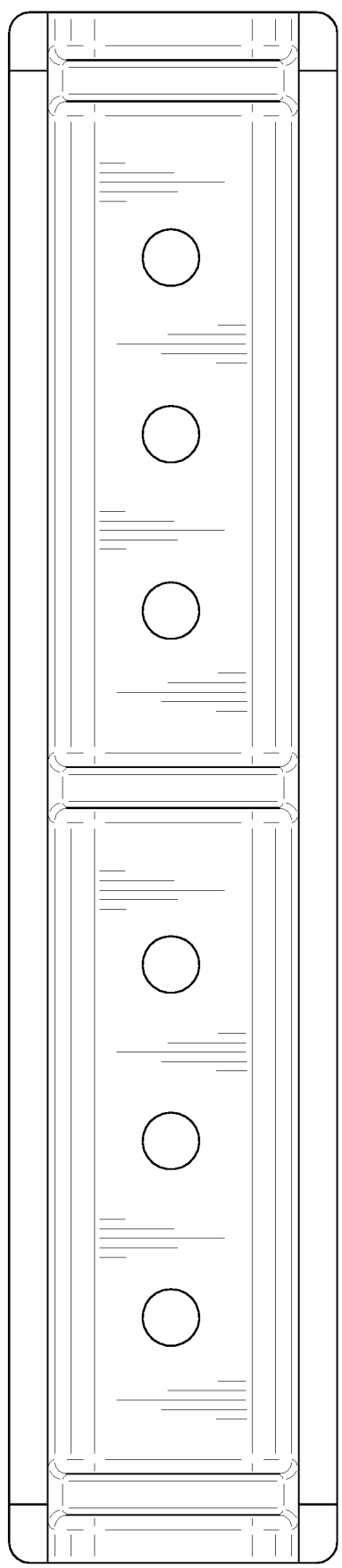
FIG. 15 is a front view of the universal vehicle wheel chock hanger of FIG. 13.
Figure 16:
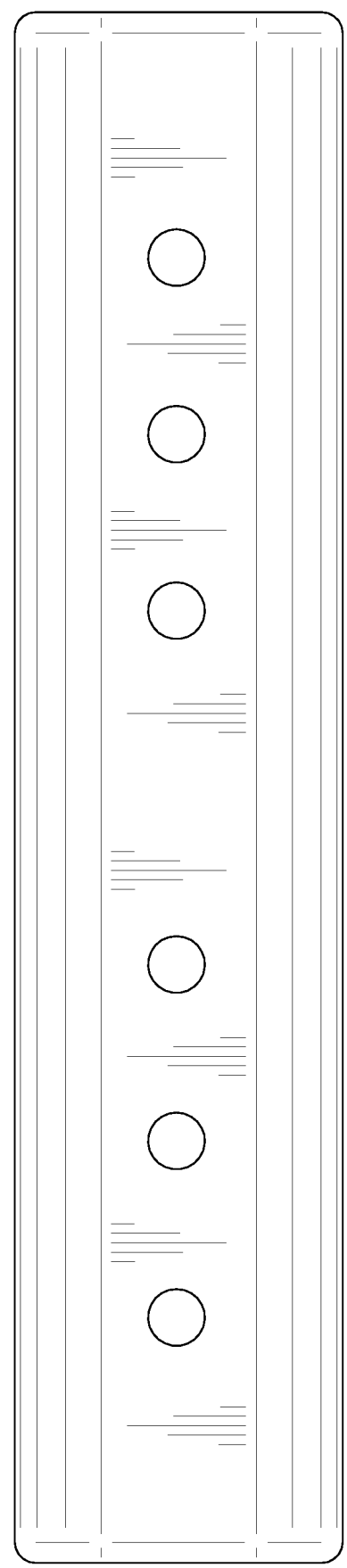
FIG. 16 is a rear view of the universal vehicle wheel chock hanger of FIG. 13.
Figure 17B:
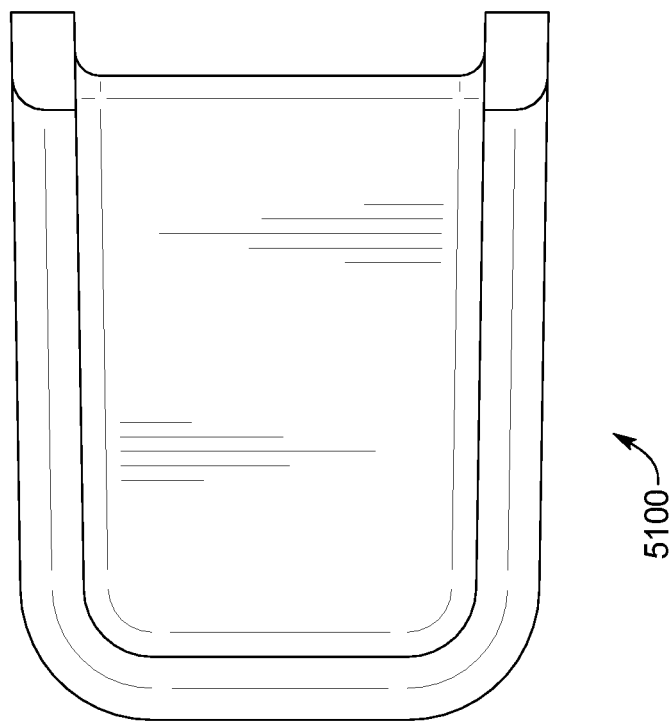
FIG. 17B is a left side view of the universal vehicle wheel chock hanger of FIG. 13.
Figure 17A:
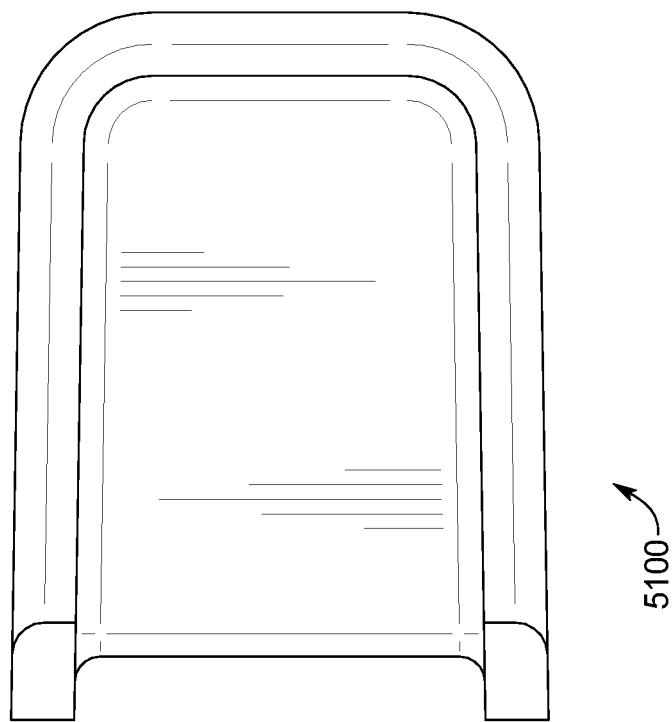
FIG. 17A is a right side view of the universal vehicle wheel chock hanger of FIG. 13.

FIG. 12 generally shows the alignment and positioning of different example chocks 3000a and 3000b relative to the vehicle wheel chock hanger 100 after the chocks 3000a and 3000b are mounted on or attached to the vehicle wheel chock hanger 100 for storage. These example chocks 3000a and 3000b do not include locking pins per se, but rather include spring biased locking members (not fully shown). When these chocks 3000a and 3000b are mounted on the chock hanger 100 as shown in FIG. 12, the portions of the respective locking members extend into the locking pin receipt holes of the first pin receiver 130 and the locking members lock onto the first pin receiver 130.

The present disclosure further contemplates that multiple vehicle wheel chock hangers 100 will be employed in each auto-rack car to hold all of the chocks in that auto-rack car when those chocks are not in use. For example, if four chocks are used to hold each vehicle in a tri-level auto-rack car that holds eighteen vehicles, then seventy-two vehicle wheel chock hangers can be employed in that auto-rack car. If the chock hanger is configured to hold more than one chock as described herein, less chock hangers can be employed. It should be appreciated that there is a need to minimize the weight of these hangers to save fuel costs. The present disclosure thus contemplates that the vehicle wheel chock hangers are relatively light-weight and easy to install to avoid installation problems, delays, and additional expenses. It should also be appreciated that the vehicle wheel chock hangers of the present disclosure can be made longer and configured to adjacently hold multiple chocks.

It should thus be appreciated that any chock that is configured to be attached to a rail in a tri-level auto-rack railroad car can be mounted on the vehicle wheel chock hanger of the present disclosure.

It should also be appreciated that various embodiments of the chock hanger configured and sized for the widest known chocks used on tri-level auto-rack railroad cars.

It should also be appreciated from the above that one or both of the locking pin receivers may be selectively employed for different known and future chocks.

It should also be appreciated from the above that the locking pin receipt openings may be selectively employed for different known and future chocks.

Referring now to FIGS. 13, 14A, 14B, 15, 16, 17A, and 17B, another example embodiment of the universal vehicle wheel chock hanger of the present disclosure is illustrated and generally indicated by numeral 5100. This chock hanger is also configured to securely (but removably) hold one or two chocks such as the chocks 1000, 2000a, 2000b, 3000a, and 3000b when such chocks are not in use. This example chock hanger 5100 is only different than the chock hanger 1000 in that it includes only two spaced apart locking pin receipt holes in each of the first pin receiver and the second pin receiver instead of four locking pin receipt holes in each of the first pin receiver and the second pin receiver. It should be appreciated from this example embodiment that the quantity of and positions of the locking pin receipt holes may vary in accordance with the present disclosure.

In other example embodiments, the universal vehicle wheel chock hanger of the present disclosure includes the mounting base, the second locking pin receiver, and the stabilizers but not the first locking pin receiver. In such embodiments, the top portions of the stablizers are configured to hold and support the top wall of the saddle of certain chocks.

It should be appreciated that the chock hanger of the present disclosure can be employed to hold other chocks. In other words, although various embodiments have been illustrated herein in reference to auto-rack cars or vehicles, in other embodiments of the present disclosure, the wheel chock hanger may be used, for example, in vehicles other than rail vehicles, such as in an on-road semi-truck car carrier or other truck/auto-driven car trailer.

It will be understood that modifications and variations may be effected without departing from the scope of the novel concepts of the present invention, and it is understood that this application is to be limited only by the scope of the claims.

The invention claimed is:

1. An auto-rack railroad car vehicle wheel chock hanger comprising:
a mounting base configured to be attached to a side wall panel of an auto-rack railroad car, the mounting base defining a plurality of spaced apart attachment holes;
a first locking pin receiver connected to and extending transversely from the mounting base, the first locking pin receiver defining a first locking pin receipt opening;
a second locking pin receiver connected to and extending transversely from the mounting base, the second locking pin receiver defining a second locking pin receipt opening,
the first locking pin receiver and the second locking pin receiver configured to co-act to hold a vehicle wheel chock via an attachment member extending therethrough, the attachment member being a component of the vehicle wheel chock rather than the auto-rack railroad car vehicle wheel chock hanger; and
a plurality of spaced apart stabilizers each abutting and transversely extending between, and thereby interconnecting, the first locking pin receiver, the second locking pin receiver, and the mounting base.

2. The auto-rack railroad car vehicle wheel chock hanger of claim 1, wherein one of the plurality of spaced apart attachment holes is an oval slot.

3. The auto-rack railroad car vehicle wheel chock hanger of claim 1, wherein the first locking pin receiver defines a plurality of spaced apart first locking pin receipt openings, and the second locking pin receiver defines a plurality of spaced apart second locking pin receipt openings, wherein the plurality of spaced apart first locking pin receipt openings include the first locking pin receipt opening and the plurality of spaced apart second locking pin receipt openings include the second locking pin receipt opening.

4. The auto-rack railroad car vehicle wheel chock hanger of claim 3, wherein the plurality of spaced apart first locking pin receipt openings of the first pin receiver are respectively aligned with the plurality of spaced apart second locking pin receipt openings of the second pin receiver.

5. The auto-rack railroad car vehicle wheel chock hanger of claim 1, wherein the first locking pin receipt opening of the first pin receiver is aligned with the second locking pin receipt opening of the second pin receiver.

6. The auto-rack railroad car vehicle wheel chock hanger of claim 1, which is formed from a metal material.

7. The auto-rack railroad car vehicle wheel chock hanger of claim 1, which is formed from an aluminum material.

8. The auto-rack railroad car vehicle wheel chock hanger of claim 1, which is formed from a plastic material.

9. An auto-rack railroad car vehicle wheel chock hanger comprising:
a mounting base configured to be attached to a side wall panel of an auto-rack railroad car, the mounting base defining a plurality of spaced apart attachment holes;
a first locking pin receiver connected to and extending transversely from the mounting base, the first locking pin receiver defining a plurality of spaced apart first locking pin receipt openings;
a second locking pin receiver connected to and extending transversely from the mounting base, the second locking pin receiver defining a plurality of spaced apart second locking pin receipt openings, wherein the first locking pin receipt openings of the first pin receiver are respectively aligned with the second locking pin receipt openings of the second pin receiver; and
a plurality of spaced apart stabilizers each abutting and transversely extending between, and thereby interconnecting, the first locking pin receiver, the second locking pin receiver, and the mounting base,
the first locking pin receiver and the second locking pin receiver configured to co-act to hold multiple vehicle wheel chocks at the same time via, for each vehicle wheel chock, an attachment member of the vehicle wheel chock extending through both the first locking pin receiver and the second locking pin receiver, each attachment member being a component of a respective vehicle wheel chock rather than the auto-rack railroad car vehicle wheel chock hanger.

10. The auto-rack railroad car vehicle wheel chock hanger of claim 9, wherein one of the attachment holes comprises a slot shape.

11. The auto-rack railroad car vehicle wheel chock hanger of claim 9, which is formed from a metal material.

12. The auto-rack railroad car vehicle wheel chock hanger of claim 9, which is formed from an aluminum material.

13. The auto-rack railroad car vehicle wheel chock hanger of claim 9, which is formed from a plastic material.

14. A wheel chock hanger comprising:
a mounting base defining a plurality of spaced apart attachment holes;
a first locking pin receiver connected to and extending transversely from the mounting base, the first locking pin receiver defining a plurality of spaced apart first locking pin receipt openings;
a second locking pin receiver connected to and extending transversely from the mounting base, the second locking pin receiver defining a plurality of spaced apart second locking pin receipt openings, wherein the first locking pin receipt openings of the first pin receiver are respectively aligned with the second locking pin receipt openings of the second pin receiver, wherein the first locking pin receiver and the second locking pin receiver are configured to co-act to hold a plurality of wheel chocks at the same time, the plurality of wheel chocks comprising different types of wheel chocks, via, for each wheel chock, an attachment member of the wheel chock extending through both the first locking pin receiver and the second locking pin receiver, each attachment member being a component of the wheel chock rather than the wheel chock hanger; and
a plurality of spaced apart stabilizers each abutting and transversely extending between, and thereby interconnecting, the first locking pin receiver, the second locking pin receiver, and the mounting base.

15. The wheel chock hanger of claim 14, wherein one of the plurality of spaced apart attachment holes is slot shaped.

16. The wheel chock hanger of claim 14, which is formed from a metal material.

17. The wheel chock hanger of claim 14, which is formed from an aluminum material.

18. The wheel chock hanger of claim 14, which is formed from a plastic material.

\* \* \* \* \*